US012656792B2

(12) United States Patent
Diehl et al.

(10) Patent No.: US 12,656,792 B2
(45) Date of Patent: Jun. 16, 2026

(54) PHASE MANAGEMENT SYSTEM IN OIL AND GAS PRODUCTION SUBSEA STREAMS

(71) Applicant: Petróleo Brasileiro S.A.—Petrobras, Rio de Janeiro (BR)

(72) Inventors: Fabio Cesar Diehl, Rio de Janeiro (BR); Fabio Alves Albuquerque, Rio de Janeiro (BR); Tatiane Oliveira Machado, Rio de Janeiro (BR); Juliana Pereira Silva, Rio de Janeiro (BR); Luiz Carlos Tosta Da Silva, Rio de Janeiro (BR); Daniel Greco Duarte, Rio de Janeiro (BR); Antonio Marcos Fonseca Bidart, Rio de Janeiro (BR); Daniel Leite Lima, Rio de Janeiro (BR); Fabricio Soares Da Silva, Rio de Janeiro (BR); Marcio Albuquerque De Souza, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 787 days.

(21) Appl. No.: 17/960,208

(22) Filed: Oct. 5, 2022

(65) Prior Publication Data

US 2023/0115384 A1 Apr. 13, 2023

(30) Foreign Application Priority Data

Oct. 7, 2021 (BR) ...................... 10 2021 020223 8

(51) Int. Cl.
*G05D 11/13* (2006.01)
*E21B 43/36* (2006.01)
(Continued)

(52) U.S. Cl.
CPC .............. *G05D 11/13* (2013.01); *E21B 43/36* (2013.01); *G05B 6/02* (2013.01); *G05B 11/36* (2013.01);
(Continued)

(58) Field of Classification Search
CPC ...................... G05B 11/42; G05B 6/02; G05B 2219/35356; G05B 13/024; G05B 11/36; G05D 11/13; E21B 43/36
See application file for complete search history.

(56) References Cited

U.S. PATENT DOCUMENTS

| | | | | |
|---|---|---|---|---|
| 3,556,218 A | * | 1/1971 | Talley, Jr. | ........... E21B 43/0175 |
| | | | | 166/368 |
| 10,570,719 B2 | | 2/2020 | Zaragoza Labes et al. | |

(Continued)

FOREIGN PATENT DOCUMENTS

| | | | |
|---|---|---|---|
| BR | 102014002291 A2 | | 7/2017 |
| CN | 201306167 Y | * | 9/2009 |

(Continued)

*Primary Examiner* — Atif H Chaudry
(74) *Attorney, Agent, or Firm* — Morrison & Foerster LLP

(57) ABSTRACT

The present invention presents a system that allows mixing in a controlled way the streams exported by two-phase or three-phase separators, allowing the management of the phases according to the processing needs of the SPUs. The main idea is that the outlet streams of the subsea separation modules can be routed to different SPUs in order to optimize the processing capacity of the surface plant.

It is capable of manipulating in real time process parameters such as GLR (Gas-Liquid Ratio), or GOR (Gas-Oil Ratio) or Water Cut (amount of water in oil) to generate the multiphase streams required by each SPU, using the own autogenous pressure of the process to carry out this adjustment, that is, without the need for pressure raising systems or artificial lifting (pumps, compressors, gas lift, etc.) of the (Continued)

export streams of the system. This is possible by means of a crossflow injection control system between the phases. However, the possibility of using pressure raising systems (pumps, compressors, etc.) is not excluded, if the SPUs are at high distances, for example, and require the use of this device.

20 Claims, 6 Drawing Sheets

(51) Int. Cl.

| | |
|---|---|
| *G05B 6/02* | (2006.01) |
| *G05B 11/36* | (2006.01) |
| *G05B 11/42* | (2006.01) |
| *G05B 13/02* | (2006.01) |

(52) U.S. Cl.
CPC ............ *G05B 11/42* (2013.01); *G05B 13/024* (2013.01); *G05B 2219/35356* (2013.01)

(56) References Cited

U.S. PATENT DOCUMENTS

| | | | |
|---|---|---|---|
| 2010/0307598 A1* | 12/2010 | Cao .................... | B01D 19/0063 |
| | | | 137/455 |
| 2022/0034455 A1* | 2/2022 | Guo ........................ | E21B 47/06 |

FOREIGN PATENT DOCUMENTS

| | | | | | |
|---|---|---|---|---|---|
| CN | 104695922 A | * | 6/2015 | ............. | E21B 43/12 |
| JP | S63274408 A | * | 11/1988 | | |
| WO | 2015138055 A1 | | 9/2015 | | |
| WO | 2021113937 A1 | | 6/2021 | | |

* cited by examiner

PHASE MANAGEMENT SYSTEM IN OIL AND GAS PRODUCTION SUBSEA STREAMS

CROSS-REFERENCE TO RELATED APPLICATION

This application claims priority to Brazilian Application No. 10 2021 020223 8 filed on Oct. 7, 2021, and entitled "PHASE MANAGEMENT SYSTEM IN OIL AND GAS PRODUCTION SUBSEA STREAMS" the disclosure of which is incorporated herein by reference in its entirety.

FIELD OF THE INVENTION

The present invention is based on a controlled way of mixing the streams exported by two-phase or three-phase separators, enabling the management of the phases according to the processing needs of the SPUs.

DESCRIPTION OF THE STATE OF THE ART

Two-phase and three-phase separation systems, such as GLSS (Gas-Liquid Subsea Separation), HISEP (High Pressure Dense Phase Separation) and WOSS (Water-Oil Subsea Separation), provide the gravitational separation of fluids according to with its specific mass. The products of these processes are distinct phases under the pressure (P) and temperature (T) conditions of the system, that is, water and oil or liquid and gas, for example. Thus, GLSS, HISEP and WOSS are phase separators and export a light phase and a heavy phase. The invention PHASE MANAGEMENT SYSTEM IN OIL AND GAS PRODUCTION SUBSEA STREAMS (Smart Phase Management-SPM) is a system that allows to mix in a controlled way the streams exported by two-phase or three-phase separators, allowing the management of the phases according to the processing needs of the SPUs.

Throughout the useful life of an oil field, the Stationary Production Units (SPU) come into operation in sequential mode. This usually results in situations where SPUs are found operating at the limit of their processing capacity, while other SPUs are slack in terms of processing. This is due to a traditional modular view of production systems where, typically, there is no interconnection between the SPUs. From the processing point of view, the production bottleneck in a field can have multiple causes combined, such as, for example, reaching the limit of gas, water and oil treatment capacity.

Document WO2021113937A1 discloses a subsea arrangement in which the lines that interconnect the producing wells to a certain SPU (stationary production unit) are arranged in such a way as to allow a certain group of producing wells to be interconnected, at the same time, to more than one SPU, by means of different configurations.

Document U.S. Ser. No. 10/570,719B2 discloses a compact integrated station of subsea systems of fluid separation and pumping, which is suitable for application in any subsea system that has the objective of separating fluids and/or solids and pumping.

Document WO2015138055A1 discloses a multiphase fluid separation by means of a multiphase separation system, where the multiphase separation system is configured to feed a multiphase fluid into an inlet line in the separation system.

All the anteriorities presented are unable to manage the fluid phases in order to meet the needs of different SPUs. They are also not able to manipulate in real time process parameters such as gas-liquid ratio, or gas-oil ratio or the amount of water in the oil to generate the multiphase streams required by each SPU.

In view of the difficulties present in the above-mentioned state of the art, and for solutions for phase management in subsea streams of oil and gas production, there arises the need of developing a technology capable of effectively enabling the management of fluids processed on the seabed and according to environmental and safety guidelines. The above-mentioned state of the art does not have the unique features that will be presented in detail below.

OBJECTIVE OF THE INVENTION

It is an objective of the invention to provide a system capable of serving offshore oil and gas production fields exploited by more than one stationary production unit, which is used in any situation where it is desired to control the proportion of phases in multiphase streams.

BRIEF DESCRIPTION OF THE INVENTION

The present invention presents a system that allows mixing in a controlled way the streams exported by two-phase or three-phase separators, allowing the management of the phases according to the processing needs of the SPUs. The main idea is that the outlet streams of the subsea separation modules can be routed to different SPUs in order to optimize the processing capacity of the surface plant.

It is capable of manipulating, in real time, process parameters such as GLR (Gas-Liquid Ratio), or GOR (Gas-Oil Ratio) or Water Cut (amount of water in oil) to generate the required multiphase streams for each SPU, using the process's own autogenous pressure to perform this adjustment, that is, without the need for pressure raising systems or artificial lifting (pumps, compressors, gas lift, etc.) of the export streams of the system. This is possible by means of a crossflow injection control system between the phases. However, the possibility of using pressure-raising systems (pumps, compressors, etc.) is not excluded, if the SPUs are at high distances, for example, and require the use of this artifice.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

Figure 1:
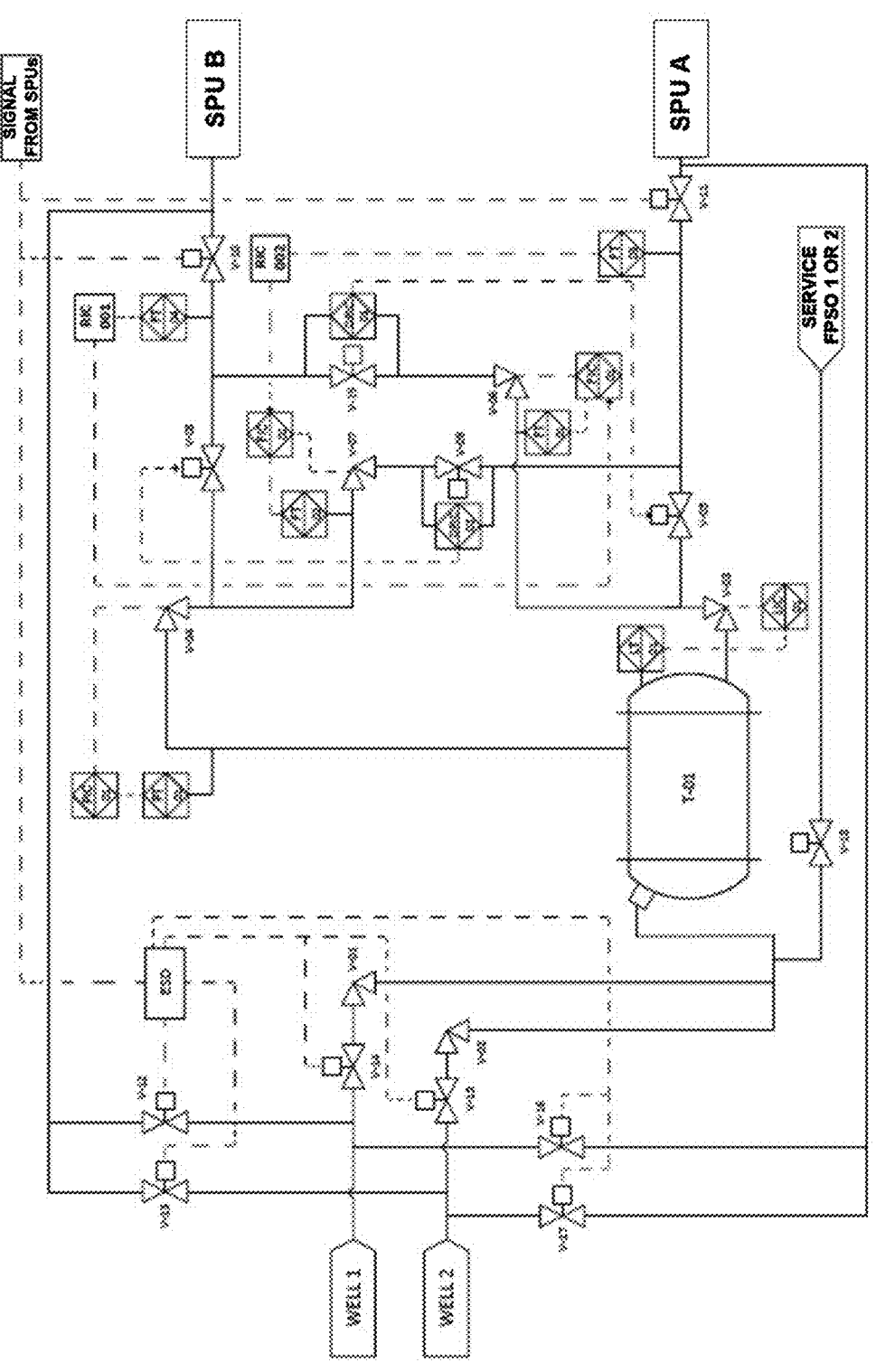
FIG. 1 illustrates the flowchart of the subsea separation system.

There follows below a detailed description of a preferred embodiment of the present invention, by way of example and in no way limiting. Nevertheless, it will be clear to one technician skilled on the subject, from reading this description, possible further embodiments of the present invention still encompassed by the essential and optional features below.

In order to illustrate the nature of the present invention and the way to practice the same, without, however, being considered as limiting its content, we can consider a field called XYZ in this invention that has three SPUs: X, Y, Z. Each of these units came into operation at different stages of field development, X=8 years ago, Y=4 years ago and Z=2 years ago. SPU X has reached its limit of water processing due to the increase in the amount of water produced WC (Water Cut) from wells connected to SPU and, for this reason, it is no longer possible to increase its oil production by means of the alignment of a new well, for example. SPU Y is reaching the maximum of its gas processing capacity by increasing the GOR (gas-oil ratio) of the wells and, in the same way as the previous unit, there is no possibility of increasing its oil production due to the restriction of gas processing plant capacity. Finally, SPU Z has a slack in gas and water treatment capacity, as it is a unit that has been in operation for a short time. If these SPUs were interconnected by means of a set of equipment and subsea pipes, it would be possible to transfer water from SPUs X and Y to SPU Z, while on the other hand, SPU Z could supply oil to the other SPUs, which would allow balancing the capacity of the units in order to optimize the processing infrastructure available, opening space for the interconnection of new wells and the maximization of oil production. The present invention proposal relates to this need, describing in detail the entire engineering arrangement necessary for the management of subsea streams and the entire control strategy. This invention allows the phases of subsea streams to be specified according to the desired oil-gas or oil-water content. This enables the active management of streams according to the processing objectives and restrictions of the set of SPUs considered, enabling the optimization of the processing capacity of a field or even multiple fields.

The main idea is that the outlet streams of the subsea separation modules can be forwarded to different SPUs in order to optimize the processing capacity of the surface plant. FIGS. 1, 2, 3, 4 and 5 in a schematic and non-limiting way of the inventive scope, represent examples of embodiment of the present invention. These figures exemplify a subsea separation system that receives the production of two wells, separates the heavy and light phases, and, coupled with the management system, adjusts the amount of light and heavy phases in each export stream to SPUs A and B.

The novelty of this invention lies in its ability to manipulate in real time process parameters such as GLR (Gas-Liquid Ratio), or GOR (Gas-Oil Ratio) or Water Cut (amount of water in oil) to generate the multiphase streams required by each SPU, using the own autogenous pressure of the process to perform this adjustment, that is, without the need for pressure raising systems or artificial lifting (pumps, compressors, gas lift, etc.) of the system. This is possible by means of a crossflow injection control system between the phases, as detailed in FIG. 3.

The applicability of the invention is not restricted to the above-mentioned systems (WOSS, HISEP and GLSS) and can be used in any process for controlled multiphase mixing.

Depending on the inlet conditions of the wells in the subsea separation system, other arrangements that promote the controllability of the phases in each export branch can be used, including, therefore, the injection of part of the production of a well into streams of export to any of the SPUs. These types of arrangements of the management system, with direct manipulation of multiphase streams, are exemplified in FIGS. 4 and 5, where the adjustments of streams exported to the SPUs are made by multiphase streams bifurcated directly from producing wells.

In cases where the lift and flow studies indicate the need to apply subsea pumping for the liquid phase, the invention maintains its applicability and becomes even more simplified, since the pressure of the liquid phase will be higher and the injection of part of this stream in the gaseous export stream can be realized by a flow rate control loop.

An example is presented below, in order to more fully illustrate the nature of the present invention and the manner of practicing the same, without, however, being considered as limiting its content.

Computer simulations were performed considering a subsea separation system that receives two producing wells with hydrocarbons predominantly in the range of $C1$ to $C60$ and high percentage of $CO_2$. These wells are directed to a separation vessel that operates at about 320 bar (32 MPa) and 75° C. Under these conditions, the light components are in a supercritical thermodynamic condition and behave with some properties of liquid and gas concomitantly. For this separation condition, it was considered that the fluid would be separated by means of the dense phase separation process called HISEP, Petrobras patent number BR102014002291-0. In this example, the HISEP separator outlet streams consist of an overhead stream of dense $CO_2$-rich gas and a bottom liquid stream containing higher molar mass hydrocarbons and water.

Figure 2:
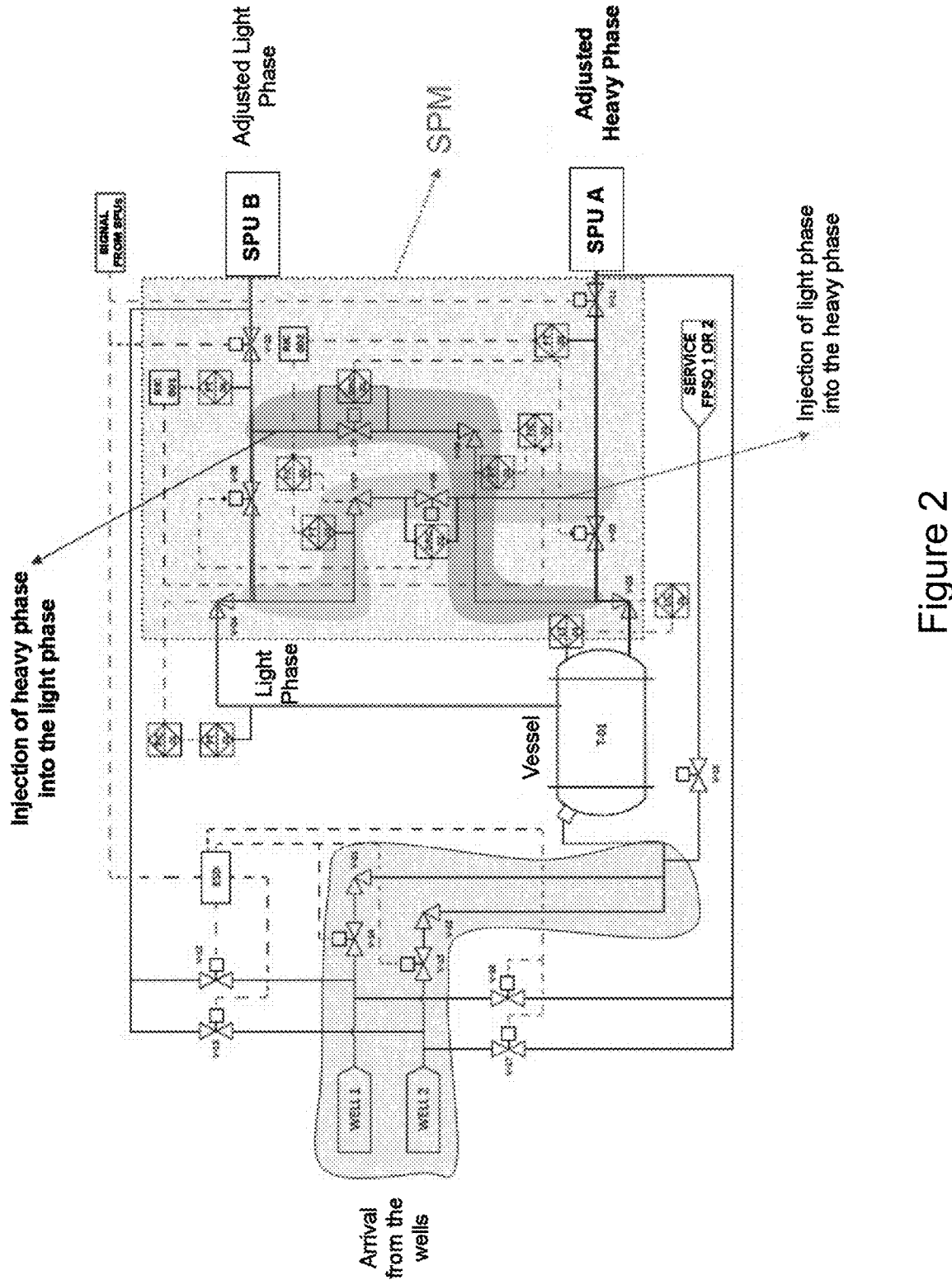
FIG. 2 illustrates the subsea separation system highlighting the main subsections including the management system.
Figure 3:
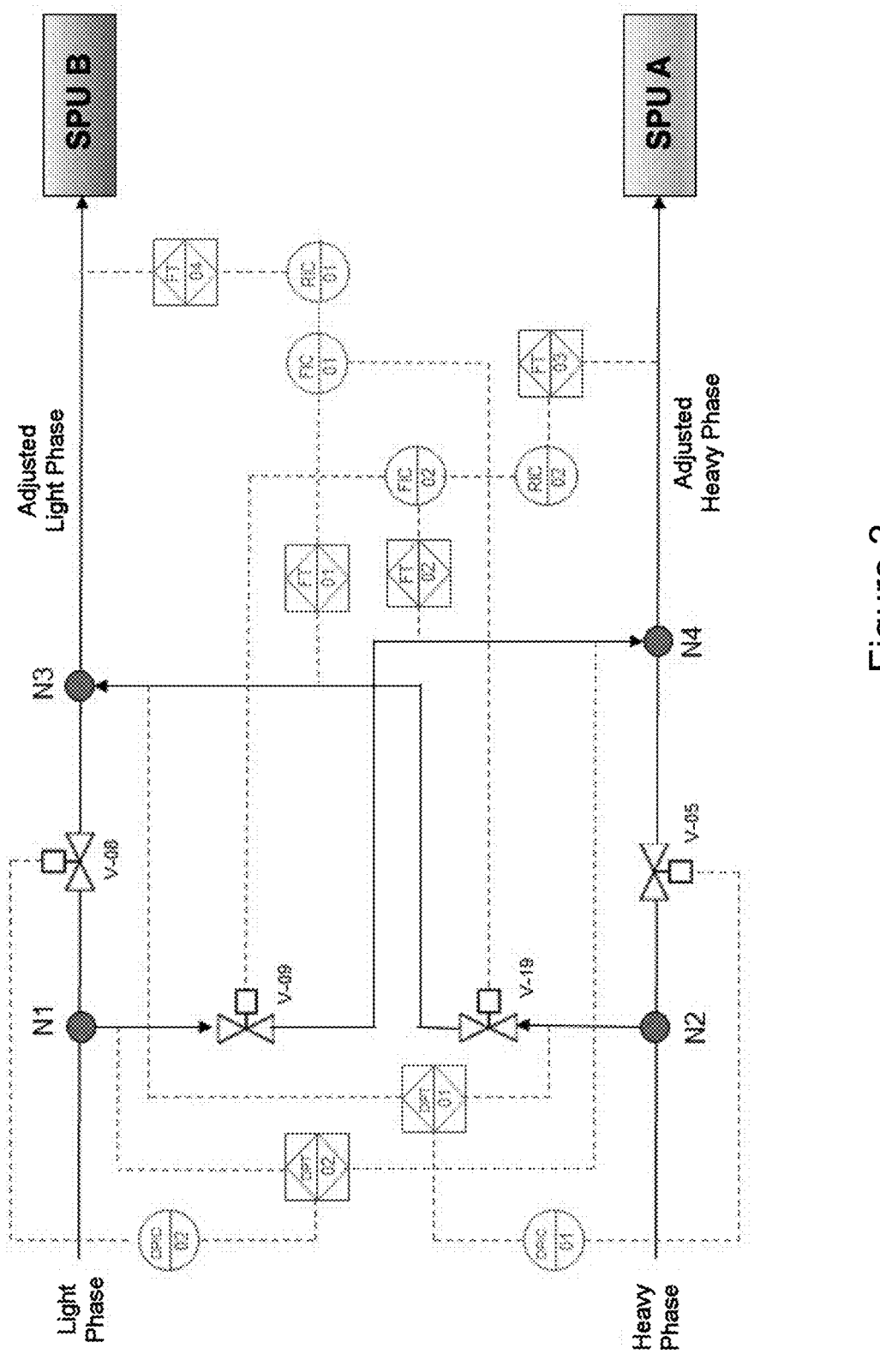
FIG. 3 illustrates the flowchart of the management system.

The management system module was connected downstream of the HISEP separator in order to control the gas-liquid ratio (GLR), according to the arrangement of FIGS. 1 and 2. For convenience, the dense phase will be called gas. In the conditions of arrival of the wells, the GLR of the inlet stream of the separator is something around 1500 $Sm^3/Sm^3$. After the separation of the HISEP, under the above-mentioned P and T conditions, the GLR of the top stream is 3600 $Sm^3/Sm^3$ and in the bottom stream the GLR is 150 $Sm^3/Sm^3$. The coupling of these streams that leave the HISEP with the management system allows choosing an export GLR for each of these streams, according to the needs of the destination SPUs. In this case, for the light stream, it is possible to choose an GLR between 1000 $Sm^3/Sm^3$ and 6000 $Sm^3/Sm^3$, more preferably between 1500 $Sm^3/Sm^3$ and 3500 $Sm^3/Sm^3$, while for the heavy phase it is possible to configure an GLR between 50 $Sm^3/Sm^3$ and 2000 $Sm^3/Sm^3$, more preferably between 150 $Sm^3/Sm^3$ and 1500 $Sm^3/Sm^3$ for the heavy chain.

When the subsea processing module consists of a three-phase separator, the phases are segregated into gas (or dense phase), oily and aqueous phases. The proposed management system has the ability to adjust the water cut value between 0% and 80%, for the oily stream sent to a first SPU, and a water cut between 20% and 100% for the aqueous stream sent to a second SPU.

Figure 4:
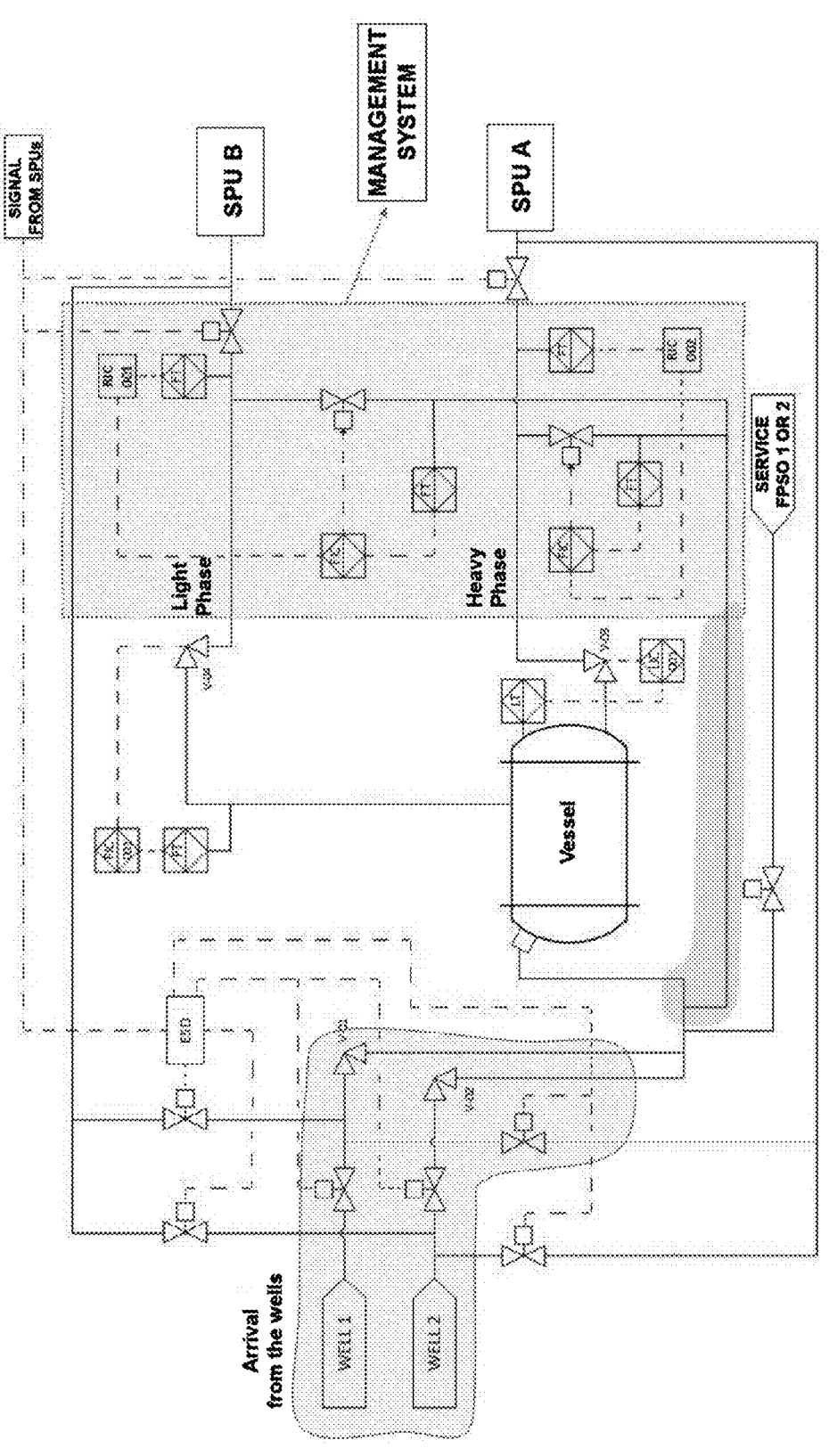
FIG. 4 illustrates the management system with multiphase stream manipulation upstream of the separator vessel to control the proportion of phases in the export streams of the subsea separation system.
Figure 5:
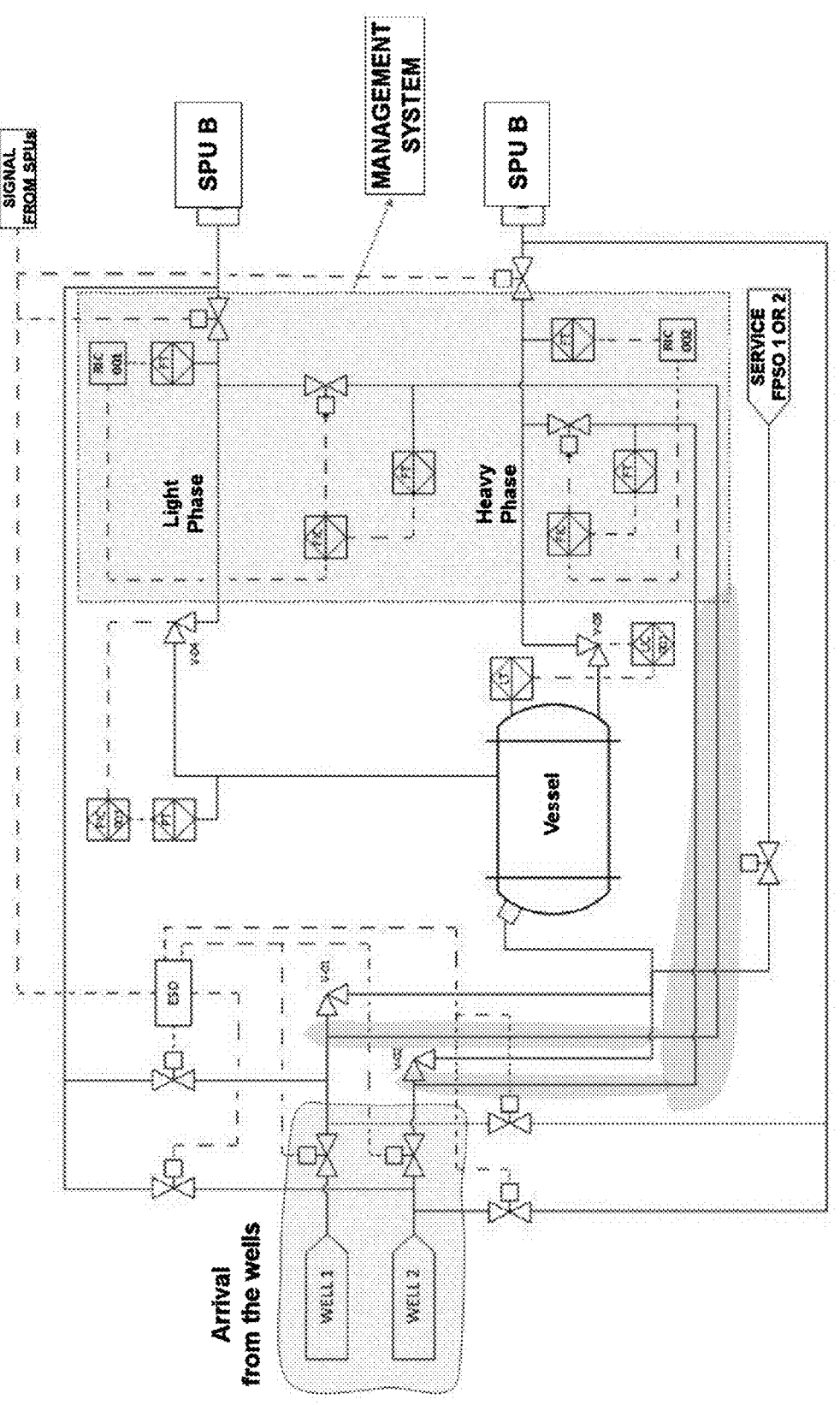
FIG. 5 illustrates the management system with multiphase stream manipulation upstream of the interface choke valves between the well and the subsea separation system for controlled phase distribution for SPUs A and B.
Figure 6:
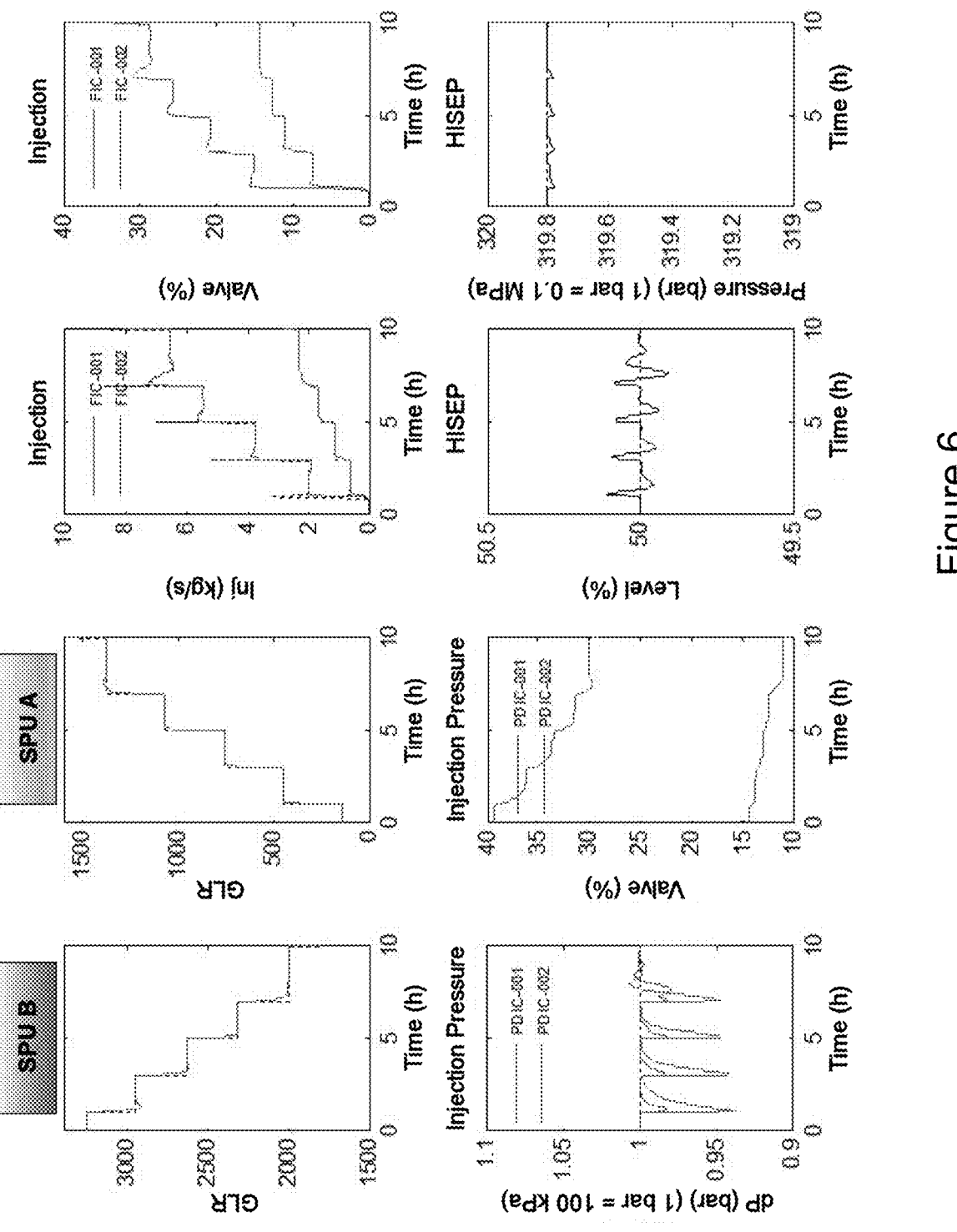
FIG. 6 illustrates the proof of concept of the management system.

FIG. 4 shows the simulated results of the management system in a set of changes in the export PGLs of the streams of SPU A and B. SPU A receives the heavy stream and SPU B receives the light stream. Altogether five combinations of GLR among the SPUs were tested in a period of 10 hours. In all situations, the management system was able to manage the light and heavy phase ratio in the streams, by means of the manipulation of cross injection controlled by the PIC-FIC cascade loop. The positive pressure balance guarantee delta P was set to 1 bar (100 kPa) for both loops PDIC-01/02. These loops show a good ability to ensure the injectivity of the system. The low impact of the management system on the fluctuation of separator pressure is also shown in this figure.

In this evaluation, in addition to the management system proving the feasibility of its concept, it is possible to verify that the engineering arrangement of this invention presents high performance and flexibility in the management of the phases of the export streams of the subsea module.

The interconnection of the invention to two-phase or three-phase separation systems and/or directly to producing wells and other subsea systems allows removing the bottleneck in the processing plants of the SPUs and extending the maximum plateau of oil production. The invention uses an innovative arrangement of equipment of measurement, driving, control systems and algorithms to achieve the proposed objective. More specifically, based on the diagram in FIG. 3, the system uses multiphase flow rate measurement in the export streams to the SPUs (FT-03 and PT-04). By means of these meters, the fractions of the phases that are the inlets of the phase ratio controllers RIC-01 and RIC-02 are estimated. These controllers are of the PID type (Proportional Integral Derivative) in cascade configuration with crossflow injection flow rate control loops FIC-01 and FIC-02. The phase proportion control loops RIC-01/02 are the master controllers and command the inlet signal of the servo controllers FIC-01/02 in order to adjust the phase proportion by means of the injection rates. The final control elements of this cascade loop are automatic valves (V-09 and V-19).

As it is directly connected to producing wells to control the gas-liquid ratio (GLR), the invention does not necessarily need to be connected to a subsea separation module.

Alternatively, the management system can use the controllers RIC-01/02 acting directly on the valves V-09/19, that is, without the flow rate control servo loop. Although the configurations are equivalent, the cascade control strategy is the most recommended for the rejection of disturbances in the flow rates, which results in greater robustness and quality of operation. The management system needs to maintain positive pressure balance between process nodes to ensure cross-stream injectivity. In addition, the possible occurrence of reverse flow would result in the complete loss of the specifications of the exported phases and, for this reason, it is recommended to use check valves in cross streams as an additional layer of protection for this type of eventuality.

The nodes that need to be simultaneously with positive pressure balance are: N1-N3, N1-N4, N2-N4 and N2-N3. To ensure that these conditions are met, the management system has two delta pressure control loops, DPIC-01 and DPIC-02, which act on valves V-05 and V-08, increasing or decreasing the pressure of the nodes N2 and N1, respectively, to maintain a positive pressure balance in the injection lines. An equivalent alternative would be V-08 and V-05 to manipulate the pressures in N3 and N4 using as controlled variable DPT01 and DPT02, respectively. In this way, the injectivity of the system is always guaranteed for different operating conditions.

The management system can be connected at the outlet of the subsea separators, directly to producing wells and other subsea system arrangements to manage the phases that will be directed to the SPUs. The top product of the separator is divided into two streams, where the first one is sent directly to SPU A and the second one is connected to the bottom product. Analogously, the bottom product is divided into two streams, where the first one is sent directly to SPU B and the second one is connected to the top product. Thus, a cross flow between light phase and heavy phase is obtained. This interconnection is done through piping and secondary fittings. These streams are manipulated to adjust the phase ratio in the export lines to the SPUs. Equivalently, the manipulated streams can be multiphase, that is, they can originate upstream of the separation system. This configuration has the benefit of having greater pressure at the origin of the flow, facilitating its injection into the export streams. However, a possible inhomogeneity of the distribution of phases at the collection points may make it difficult to fine-tune the phase ratio in the streams destined for the SPUs.

The instrumentation of the management system is done at different points in the system:

a) Multiphase flow rate measurement—meters installed in the management system outlet streams, which will be exported to the SPUs;

b) Single-phase flow rate measurement—two meters installed in the crossflow streams that connect the top with the bottom and the bottom with the top;

c) Measurement of differential pressure—two meters of differential pressure in the crossflow streams or in the multiphase streams that interconnect upstream and downstream of the separation system. The control valves allow the activation and modulation of opening remotely; d) Valves in the cross-flow lines between nodes N1-N4 and N2-N3—two valves to control the injection flow rate between top and bottom and vice versa;

e) Valves in the main lines between nodes N1-N3 and N2-N4—two valves to control the pressure drop in the injection lines between top and bottom and vice versa. The controllers do the work to link the measurements to the valves in a logical way while maintaining the desired phase ratio specifications in the export streams to the SPUs.

The control structure proposed in this invention has:

f) Master control (cascade) loop—two light phase-heavy phase ratio control loops;

g) Servo (cascade) control loop—two injection flow rate control loops of light into heavy and heavy into light. These loops work under the command of the phase ratio control loops;

h) Pressure delta control loop: two pressure drop control loops between nodes N1-N4 and N2-N3. These loops work to ensure positive pressure balance and secure cross-injection capability between the main streams.

The phase management system in oil and gas production subsea streams comprises: single-phase flow meters, differential pressure meters, multiphase flow meters, pressure meters, PID controllers, control algorithms, pipe fittings, control valves, cascade PID controllers, interconnection pipes.

The invention claimed is:

1. A phase management system in oil and gas production subsea streams, comprising: single-phase flow meters, differential pressure meters, multiphase flow meters, pressure meters, PID controllers, control algorithms, pipe fittings, control valves, cascade PID controllers, interconnection pipes, and a crossflow injection control system between phases.

2. The system according to claim 1, wherein the phase management system manipulates in real time process parameters to generate multiphase streams required by at least one stationary production unit (SPU).

3. The system of claim 2, wherein the phase management system uses autogenous pressure to adjust process parameters without pressure raising systems or artificial lifting.

4. The system according to claim 2, wherein the process parameters comprise GLR (Gas-Liquid Ratio), GOR (Gas-Oil Ratio), or Water Cut, wherein the Water Cut is an amount of water in oil.

5. The system of claim 1, wherein, at high distances from at least one stationary production unit (SPU), the phase management system uses pressure raising systems.

6. The system according to claim 5, wherein the pressure raising systems comprise pumps or compressors.

7. The system of claim 1, wherein the phase management system is used in any process for controlled multiphase mixing.

8. The system of claim 1, wherein the phase management system injects part of a production of a well into export streams for at least one stationary production unit (SPU), controlling phases in each export branch.

9. The system of claim 1, wherein adjustments of streams exported to at least one stationary production unit (SPU) are made by multiphase streams bifurcated directly from producing wells.

10. The system of claim 1, wherein the phase management system is connected downstream of two-phase or three-phase subsea separators to control a gas-liquid ratio (GLR).

11. The system of claim 1, wherein the phase management system is directly connected to producing wells to control a gas-liquid ratio (GLR), without necessarily being connected to a subsea separation module.

12. The system of claim 11, wherein the phase management system adjusts the GLR value between 1000 $Sm^3/Sm^3$ and 6000 $Sm^3/Sm^3$ for a light stream, and an GLR between 50 $Sm^3/Sm^3$ and 2000 $Sm^3/Sm^3$ a heavy stream.

13. The system of claim 1, wherein the phase management system adjusts a water cut value between 0% and 80% for an oily stream sent to a first stationary production unit (SPU), and a water cut between 20% and 100% for an aqueous stream sent to a second SPU.

14. The system of claim 1, comprising a combination of PID controllers in crossflow injection flow rate control loops.

15. The system of claim 1, wherein phase proportion control loops are master controllers and command an inlet signal of servo controllers to adjust a proportion of phases through injection rates.

16. The system of claim 1, wherein automatic valves are final control elements of a cascade loop.

17. The system of claim 1, wherein the phase management system is configured to use controllers acting directly on automatic valves.

18. The system of claim 1, wherein the phase management system uses check valves in cross streams as an additional layer of protection.

19. The system of claim 1, wherein two pressure delta control loops, act on valves, increasing or decreasing a pressure of process nodes.

20. The system of claim 1, wherein the phase management system is connected at an outlet of subsea separators, directly to producing wells and other arrangements of subsea systems to manage phases that will be directed to at least one stationary production unit (SPU).

* * * * *